(12) United States Patent
Lee et al.

(10) Patent No.: US 12,220,691 B2
(45) Date of Patent: *Feb. 11, 2025

(54) THERMALLY STABLE HYDROCARBON-BASED ANION EXCHANGE MEMBRANE AND IONOMERS

(71) Applicant: RENSSELAER POLYTECHNIC INSTITUTE, Troy, NY (US)

(72) Inventors: Sangwoo Lee, Cohoes, NY (US); Chulsung Bae, Cohoes, NY (US); Carrie Lynn Trant, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,624

(22) Filed: Mar. 18, 2024

(65) Prior Publication Data
US 2024/0286123 A1    Aug. 29, 2024

Related U.S. Application Data

(60) Division of application No. 17/901,985, filed on Sep. 2, 2022, now Pat. No. 11,969,723, which is a (Continued)

(51) Int. Cl.
*B01J 41/14* (2006.01)
*C08F 212/08* (2006.01)
(Continued)

(52) U.S. Cl.
CPC ............. *B01J 41/14* (2013.01); *C08F 212/08* (2013.01); *C08F 212/32* (2013.01); *C08J 5/2231* (2013.01); *C08J 2325/08* (2013.01)

(58) Field of Classification Search
CPC ....... B01J 41/14; C08F 212/38; C08F 212/08; C08J 6/2231; C08J 2325/08
(Continued)

(56) References Cited

U.S. PATENT DOCUMENTS 4,126,589 A * 11/1978 Hamada ................... C08J 5/225
521/31
9,580,824 B2 * 2/2017 Masel ....................... C25B 1/04
(Continued)

OTHER PUBLICATIONS

Fan et al. "Living Anionic Surface-Initiated Polymerization (LASIP) of Styrene from Clay Nanoparticles Using Surface Bound 1,1-Diphenylethylene (DPE) Initiators", Langmuir 2002, 18, 4511-4518. (Year: 2002).*

*Primary Examiner* — Michael M. Bernshteyn
(74) *Attorney, Agent, or Firm* — Barclay Damon LLP; Anthony P. Gangemi

(57) ABSTRACT

An anion exchange membrane is composed of a copolymer of 1,1-diphenylethylene and one or more styrene monomers, such as 4-tert-butylstyrene. The copolymer includes a backbone substituted with a plurality of ionic groups coupled to phenyl groups on the backbone via hydrocarbyl tethers between about 1 and about 7 carbons in length. High-temperature conditions enabled by these copolymers enhance conductivity performance, making them particularly suitable for use in anion exchange membranes in fuel cells, electrolyzers employing hydrogen, ion separations, etc. The properties of the membranes can be tuned via the degree of functionalization of the phenyl groups and selection of the functional groups, such as quaternary ammonium groups. Several processes can be used to incorporate the desired ionic functional groups into the polymers, such as chloromethylation, radical bromination, Friedel-Crafts acylation and alkylation, sulfonation followed by amination, or combinations thereof.

6 Claims, 10 Drawing Sheets

Related U.S. Application Data continuation of application No. 17/208,364, filed on Mar. 22, 2021, now Pat. No. 11,465,139.

(60) Provisional application No. 62/992,230, filed on Mar. 20, 2020.

(51) Int. Cl.
*C08F 212/32* (2006.01)
*C08J 5/22* (2006.01)

(58) Field of Classification Search
USPC .......................................................... 521/27
See application file for complete search history.

(56) References Cited

U.S. PATENT DOCUMENTS

| | | | | |
|---|---|---|---|---|
| 2002/0010261 A1* | 1/2002 | Callahan | ................ | H01B 1/122 |
| | | | | 524/832 |
| 2015/0307659 A1* | 10/2015 | Hong | ...................... | H01M 8/20 |
| | | | | 429/492 |

\* cited by examiner

THERMALLY STABLE HYDROCARBON-BASED ANION EXCHANGE MEMBRANE AND IONOMERS

CROSS REFERENCE TO RELATED APPLICATIONS

This application is a divisional of U.S. Utility patent application Ser. No. 17/901,985, filed Sep. 2, 2022, now U.S. Pat. No. 11,969,723, which is a continuation of U.S. Utility patent application Ser. No. 17/208,364, filed Mar. 22, 2021, now U.S. Pat. No. 11,465,139, which claims the benefit of U.S. Provisional Patent Application No. 62/992,230, filed on Mar. 20, 2020, which is incorporated herein by reference in its entirety.

STATEMENT REGARDING FEDERALLY SPONSORED RESEARCH AND DEVELOPMENT

This invention was made with U.S. Government support under Grant Number DOE-DE-AC52-06NA25396 awarded by U.S. Department of Energy. The United States Government has certain rights in the invention.

BACKGROUND

Fuel cell and water electrolyzer devices are important chemical-energy conversion devices for sustainable and renewable energy infrastructures. Currently, anion exchange systems for these applications are considered the most promising alternative to the proton exchange system due to its potentially low fabrication cost.

Ion exchange membranes such as anion exchange membranes (AEMs) allow transportation of anions (e.g., OH$^-$, Cl$^-$, Br$^-$, etc.) across electrodes (cathode to anode and vice versa) in electrochemical reactions. By way of example, AEMs are one of the most critical components of fuel cells where hydrogen and oxygen are used to generate electricity and water by-product. They are also used in water electrolysis where water splits into hydrogen and oxygen with the help of electricity, which is the cleanest and the most desirable process of hydrogen production. Other areas of AEMs include electrochemical hydrogen compressors, batteries, sensors, and actuators (plastic membranes swing reversibly as a result of migration of ions). However, one of the major challenges for the industry remains the lack of low-cost and high-performance membranes for the anion exchange devices such as fuel cells and electrolyzers.

SUMMARY

Some embodiments of the present disclosure include an ion exchange membrane material including a polymer according to Formula I:

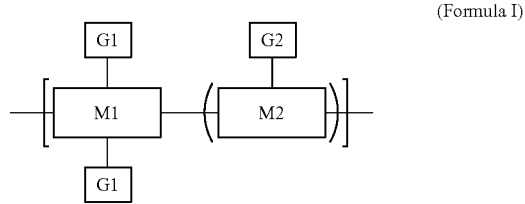

(Formula I)

In some embodiments, M1 is a diphenylalkylene, M2 is a styrene, G1 includes one or more ionic functional groups, hydrocarbyl groups, H, or combinations thereof, and G2 includes one or more ionic functional groups, hydrocarbyl groups, H, or combinations thereof. In some embodiments, the polymer includes the structure according to Formula II:

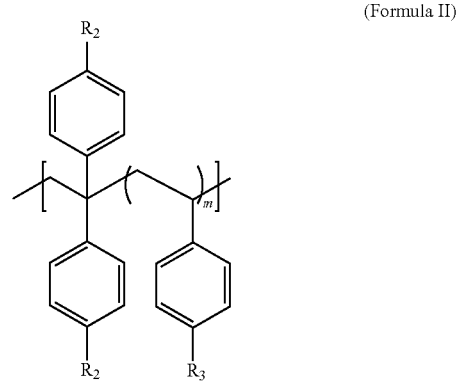

(Formula II)

In some embodiments, $R_2$ is H, an alkylated substrate, or combinations thereof, $R_3$ is H, a tert-butyl group, an alkylated substrate, or combinations thereof, and m is 1 or more. In some embodiments, the alkylated substrate includes a hydrocarbyl group and at least one ionic group. In some embodiments, the alkylated substrate includes one or more quaternary ammonium groups, one or more multication hydrocarbyl groups, one or more halide groups, or combinations thereof. In some embodiments, the alkylated substrate includes Formula III:

(Formula III)

In some embodiments, each $R_4$ includes H or a hydrocarbyl group, n=1 to about 20, and X includes one or more hydroxides, halides, or combinations thereof. In some embodiments, the percentage of $R_2$ and $R_3$ that are an alkylated substrate is between about 10% and about 100%.

Some embodiments of the present disclosure include a method of making an ion exchange membrane material including providing a reaction medium including diphenylalkylene and styrene, copolymerizing a polymer backbone from the diphenylalkylene and styrene, and reacting the polymer backbone to functionalize phenyl groups on the polymer backbone with a plurality of ionic functional groups. In some embodiments, reacting the polymer backbone to functionalize phenyl groups on the polymer backbone with a plurality of ionic functional groups includes chloromethylation, radical bromination, Friedel-Crafts acylation and alkylation, sulfonation followed by amination, or combinations thereof. In some embodiments, reacting the polymer backbone to functionalize phenyl groups on the polymer backbone with a plurality of ionic functional groups includes reacting the polymer backbone with one or more alkylated substrates, wherein the alkylated substrate includes a hydrocarbyl group and at least one ionic group. In some embodiments, the diphenylalkylene includes 1,1-diphenylethylene. In some embodiments, the styrene is substituted styrene, unsubstituted styrene, or combinations thereof.

Some embodiments of the present disclosure include a method of making an anion exchange membrane including providing a reaction medium including 1,1-diphenylethylene monomers and 4-tert-butylstyrene monomers, copolymerizing a polymer backbone including the 1,1-diphenylethylene monomers and 4-tert-butylstyrene monomers, grafting a plurality of functional groups to phenyl groups on the polymer backbone to achieve a degree of functionalization between about 10% and about 60%, and casting the polymer as an anion exchange membrane. In some embodiments, grafting a plurality of functional groups to phenyl groups on the polymer backbone includes chloromethylation, radical bromination, Friedel-Crafts acylation and alkylation, and sulfonation followed by amination, or combinations thereof. In some embodiments, the functional groups include alkylated substrates including a hydrocarbyl group and at least one ionic group. In some embodiments, the polymer has a structure according to Formula II:

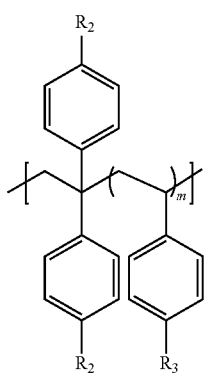

(Formula II)

In some embodiments, $R_2$ is H, an alkylated substrate, or combinations thereof, $R_3$ is a tert-butyl group, and m is 1 or more. In some embodiments, the alkylated substrate includes one or more quaternary ammonium groups, one or more multication hydrocarbyl groups, one or more halide groups, or combinations thereof. In some embodiments, the alkylated substrate includes Formula III:

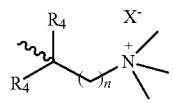

(Formula III)

In some embodiments, each $R_4$ includes H or $CH_3$, n=1 to about 7, and X includes a hydroxide, a halide, or combinations thereof.

DETAILED DESCRIPTION

Figure 1:
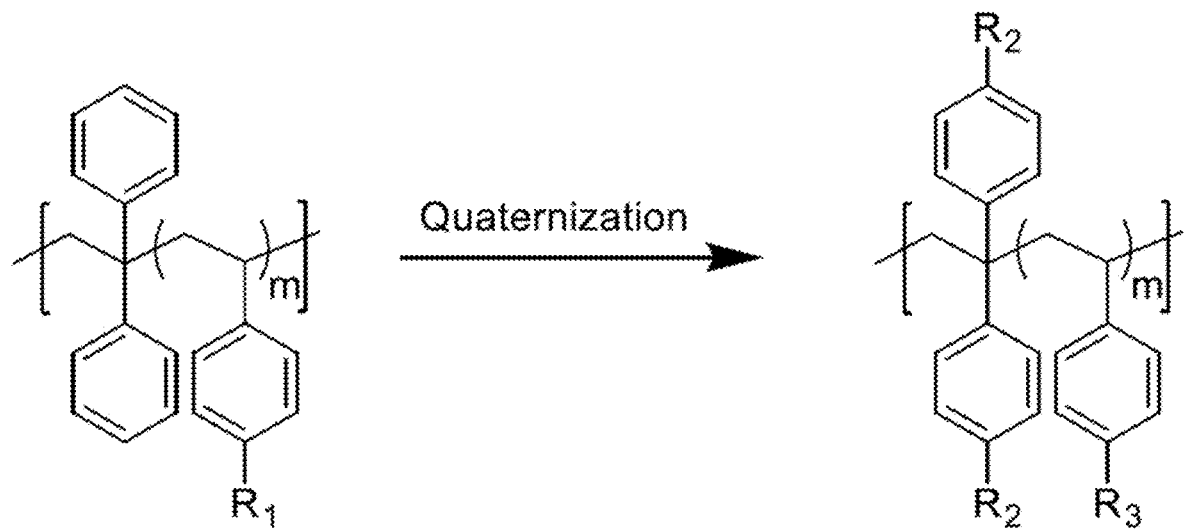
FIG. 1 is a schematic representation of a method of making an ion exchange membrane material according to some embodiments of the present disclosure.

Aspects of the disclosed subject matter include an ion exchange membrane material composed of one or more polymers. In some embodiments, the one or more polymers are copolymers or block copolymers. As will be discussed in greater detail below, in some embodiments, the copolymers are produced, in part, via a copolymerization reaction between one or more diphenylalkylene reaction components and one or more styrene reaction components. In some embodiments, the diphenylalkylene reaction component includes diphenylalkylene monomers, diphenylalkylene oligomers, diphenylalkylene polymers, or combinations thereof. In some embodiments, the diphenylalkylene reaction component includes substituted diphenylalkylene monomers, unsubstituted diphenylalkylene monomers, or combinations thereof. In some embodiments, the diphenylalkylene reaction component includes one or more functional groups. In some embodiments, the one or more functional groups include one or more ionic functional groups, i.e., a functional group including an ionic group. In some embodiments, the one or more functional groups include a hydrocarbyl group and at least one ionic group. As used herein, the term "hydrocarbyl" is used to refer to saturated and unsaturated hydrocarbon groups including 1 or more carbon atoms. The hydrocarbyl group can be acyclic, cyclic, or combinations thereof. The hydrocarbyl group can be branched or unbranched. The hydrocarbyl group can be unsubstituted or substituted with one or more functional groups. In some embodiments, one or both phenyl groups of the diphenylalkylene reaction component includes one or more functional groups. In some embodiments, the diphenylalkylene reaction component includes 1,1-diphenylethylene. In some embodiments, the styrene reaction component includes styrene monomers, styrene oligomers, styrene polymers, or combinations thereof. In some embodiments, the styrene reaction component includes substituted styrene, unsubstituted styrene, or combinations thereof. In some embodiments, the styrene reaction component includes one or more functional groups. In some embodiments, the phenyl group of the styrene reaction component includes one or more functional groups. In some embodiments, the one or more functional groups include one or more ionic functional groups, hydrocarbyl groups, or combinations thereof. In some embodiments, the one or more functional groups include a hydrocarbyl group and at least one ionic group. In some embodiments, the styrene reaction component includes 4-tert-butylstyrene. In some embodiments, the one or more polymers are functionalized with one or more functional groups during copolymerization, after copolymerization, or combinations thereof. In some embodiments, phenyl groups of the copolymers are with functionalized one or more functional groups, as will be discussed in greater detail below.

In some embodiments, the one or more polymers include the structure according to Formula I:

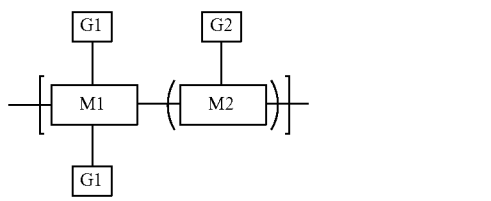

(Formula I)

In some embodiments, M1 is a diphenylalkylene. In some embodiments, M2 is a styrene. In some embodiments, G1 includes one or more ionic functional groups, hydrocarbyl groups, H, or combinations thereof. In some embodiments, G2 includes one or more ionic functional groups, hydrocarbyl groups, H, or combinations thereof.

In some embodiments, the one or more polymers include the structure according to Formula II:

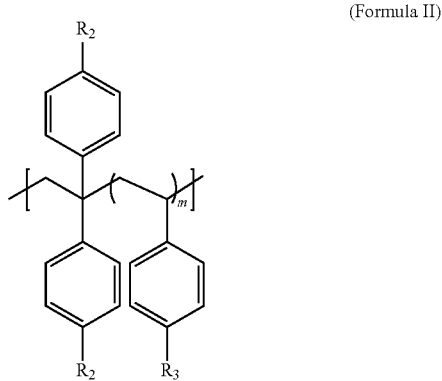

(Formula II)

In some embodiments, each $R_2$ is H, an alkylated substrate, or combinations thereof. In some embodiments, $R_3$ is H, a tert-butyl group, an alkylated substrate, or combinations thereof. In some embodiments, m is 1 or more. In some embodiments, m is 2, 3, 4, etc. In some embodiments, m is 10 or more. In some embodiments, m is 20 or more. In some embodiments, m is 30 or more. In some embodiments, m is 40 or more. In some embodiments, m is 50 or more. In some embodiments, m is 75 or more. In some embodiments, m is 100 or more. In some embodiments, in a network of polymers that include the structure of formula II, the value of m for adjacent repeating units varies. In some embodiments, alkylated substrates are substantially evenly distributed along the polymer. In some embodiments, the polymer has a degree of functionalization, i.e., the percentage of $R_2$ and $R_3$ that are an alkylated substrate, between about 10% and about 100%. In some embodiments, the polymer has a degree of functionalization between about 10% and about 60%.

In some embodiments, the alkylated substrate includes a hydrocarbyl group and at least one ionic group. In some embodiments, the alkylated substrate includes one or more quaternary ammonium groups, one or more multication hydrocarbyl groups, one or more halide groups, or combinations thereof. In some embodiments, the alkylated substrate includes Formula III:

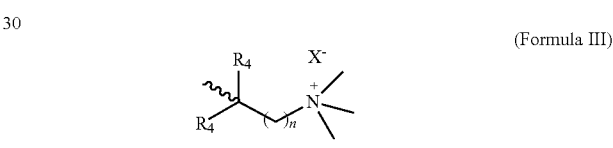

(Formula III)

In some embodiments, each $R_4$ includes H or a hydrocarbyl group. In some embodiments, each $R_4$ includes H or $CH_3$. In some embodiments, n is between about 1 and about 20. In some embodiments, n is between about 1 and about 7. In some embodiments, X includes one or more hydroxides, halides, or combinations thereof.

In some embodiments, the alkylated substrate includes Formula IV:

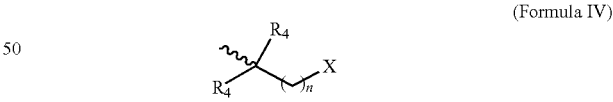

(Formula IV)

In some embodiments, each $R_4$ includes H or a hydrocarbyl group. In some embodiments, each $R_4$ includes H or $CH_3$. In some embodiments, n is between about 1 and about 20. In some embodiments, n is between about 1 and about 7. In some embodiments, X includes a halide. In some embodiments, X includes Cl or Br. In some embodiments, polymers functionalized with alkylated substrates according to Formula IV are subjected to a substitution reaction with one or more tertiary amines in order to replace the halide groups and arrive at the structure according to Formula III. In some embodiments, halide ions present after the substitution reaction are replaced, e.g., with hydroxide ions via ionic exchange reaction.

In some embodiments, the polymer includes the structure according to Formula V:

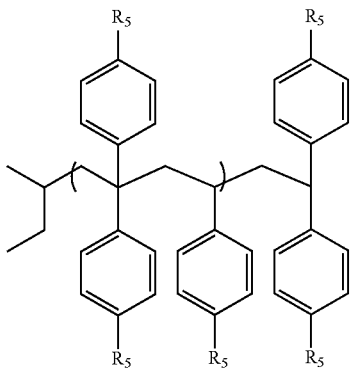

(Formula V)

In some embodiments, each $R_5$ is one of H, an alkylated substrate, or combinations thereof. In some embodiments, each $R_5$ is one of H, the structure according to Formula III, or combinations thereof. In some embodiments, X includes a hydroxide. In some embodiments, each $R_5$ is one of H, the structure according to Formula IV, or combinations thereof. In some embodiments, the polymer has a degree of functionalization between about 10% and about 100%. In some embodiments, the polymer has a degree of functionalization between about 10% and about 60%.

In some embodiments, the polymer includes the structure according to Formula VI:

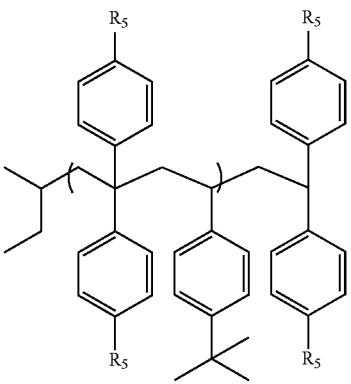

(Formula VI)

In some embodiments, each $R_5$ is one of H, an alkylated substrate, or combinations thereof. In some embodiments, each $R_5$ is one of H, the structure according to Formula III, or combinations thereof. In some embodiments, X includes a hydroxide. In some embodiments, each $R_5$ is one of H, the structure according to Formula IV, or combinations thereof. In some embodiments, the polymer has a degree of functionalization between about 10% and about 100%. In some embodiments, the polymer has a degree of functionalization between about 10% and about 60%.

Figure 2:
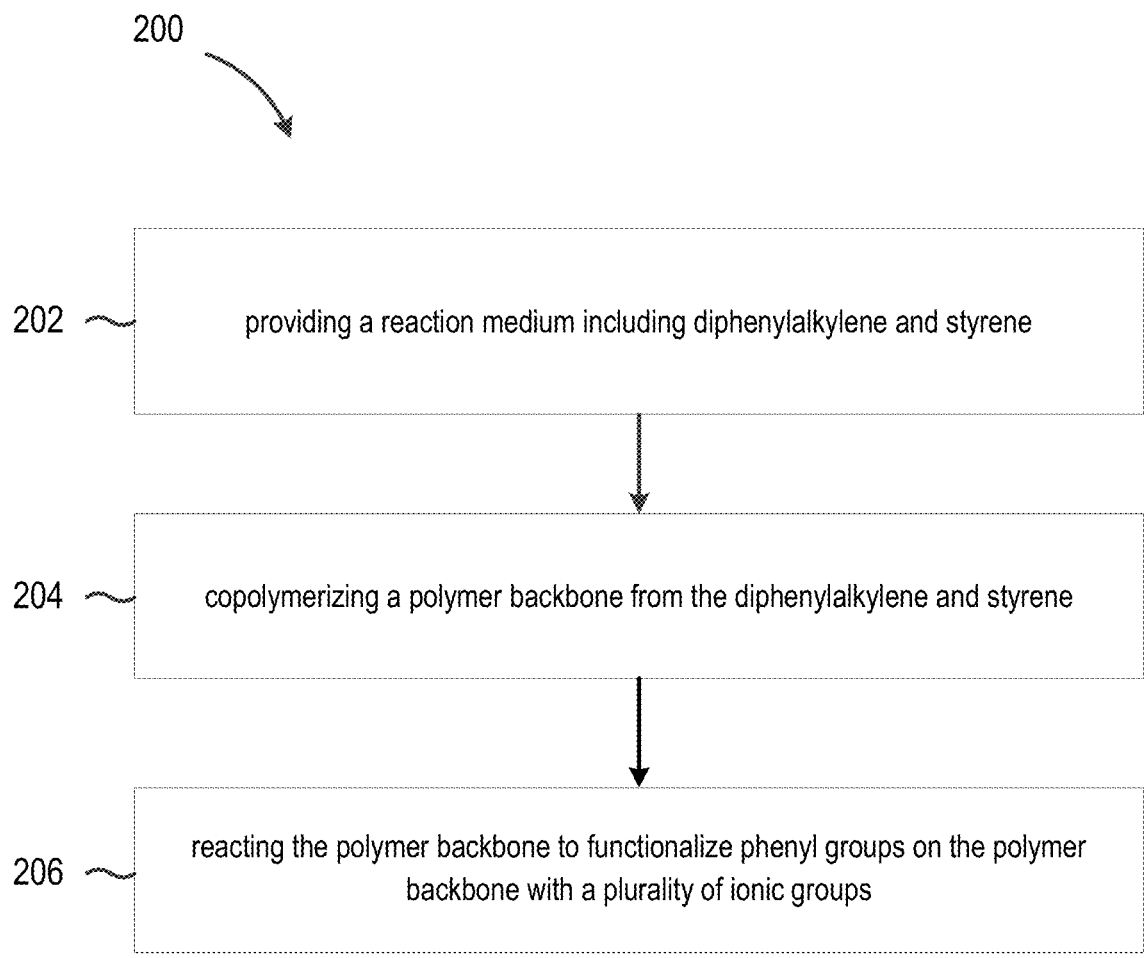
FIG. 2 is a chart of a method of making an ion exchange membrane material according to some embodiments of the present disclosure.

Referring now to FIG. 1, as discussed above, polymers consistent with the embodiments of the present disclosure can generally be formed by copolymerizing diphenylalkylenes and styrenes, then functionalizing the phenyl groups, e.g., quaternization. In the exemplary embodiment shown in FIG. 1, each $R_1$ is one or more of H, a tert-butyl group, or combinations thereof. Referring now to FIG. 2, some embodiments of the present disclosure are directed to a method 200 of making an ion exchange membrane material. In some embodiments, at 202, a reaction medium is provided. In some embodiments, the reaction medium includes diphenylalkylene and styrene. In some embodiments, the diphenylalkylene includes diphenylalkylene monomers, diphenylalkylene oligomers, diphenylalkylene polymers, or combinations thereof. In some embodiments, the diphenylalkylene is unsubstituted. In some embodiments, the diphenylalkylene includes 1,1-diphenylethylene. In some embodiments, the styrene includes styrene monomers, styrene oligomers, styrene polymers, or combinations thereof. In some embodiments, the styrene includes substituted styrene, unsubstituted styrene, or combinations thereof. In some embodiments, the styrene includes one or more functional groups. In some embodiments, the phenyl group of the styrene reaction component includes one or more functional groups. In some embodiments, the styrene is 4-tert-butylstyrene. At 204, a polymer backbone is copolymerized from the diphenylalkylene and styrene. In some embodiments, styrene is more abundant in the polymer backbone than diphenylalkylene.

In some embodiments, at 206, the polymer backbone is functionalized with a plurality of ionic functional groups at phenyl groups on the polymer backbone. In some embodiments, the phenyl groups on the polymer backbone are functionalized with ionic functional groups via chloromethylation, radical bromination, Friedel-Crafts acylation and alkylation, sulfonation followed by amination, or combinations thereof. In some embodiments, the ionic functional groups are present in alkylated substrates. In some embodiments, the polymer backbone is reacted with one or more alkylated substrates. In some embodiments, the polymer backbone is reacted with one or more alkylated substrates such that the degree of functionalization of the phenyl groups in the polymer backbone is between about 10% to about 100%. In some embodiments, the polymer backbone is reacted with one or more alkylated substrates such that the degree of functionalization of the phenyl groups in the polymer backbone is between about 10% to about 60%. In some embodiments, the polymer backbone is functionalized with one or more haloalkylated precursor substrates. In some embodiments, the one or more haloalkylated precursor substrates include a tertiary alcohol and a halogenated hydrocarbon. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, the halide of the attached haloalkylated precursor substrate is substituted with another ionic group, e.g., a quaternary ammonium group. In some embodiments, the polymers are directly employed, post-modified, or combinations thereof, e.g., for use in fabricating alkaline anion exchange membranes.

Figure 3:
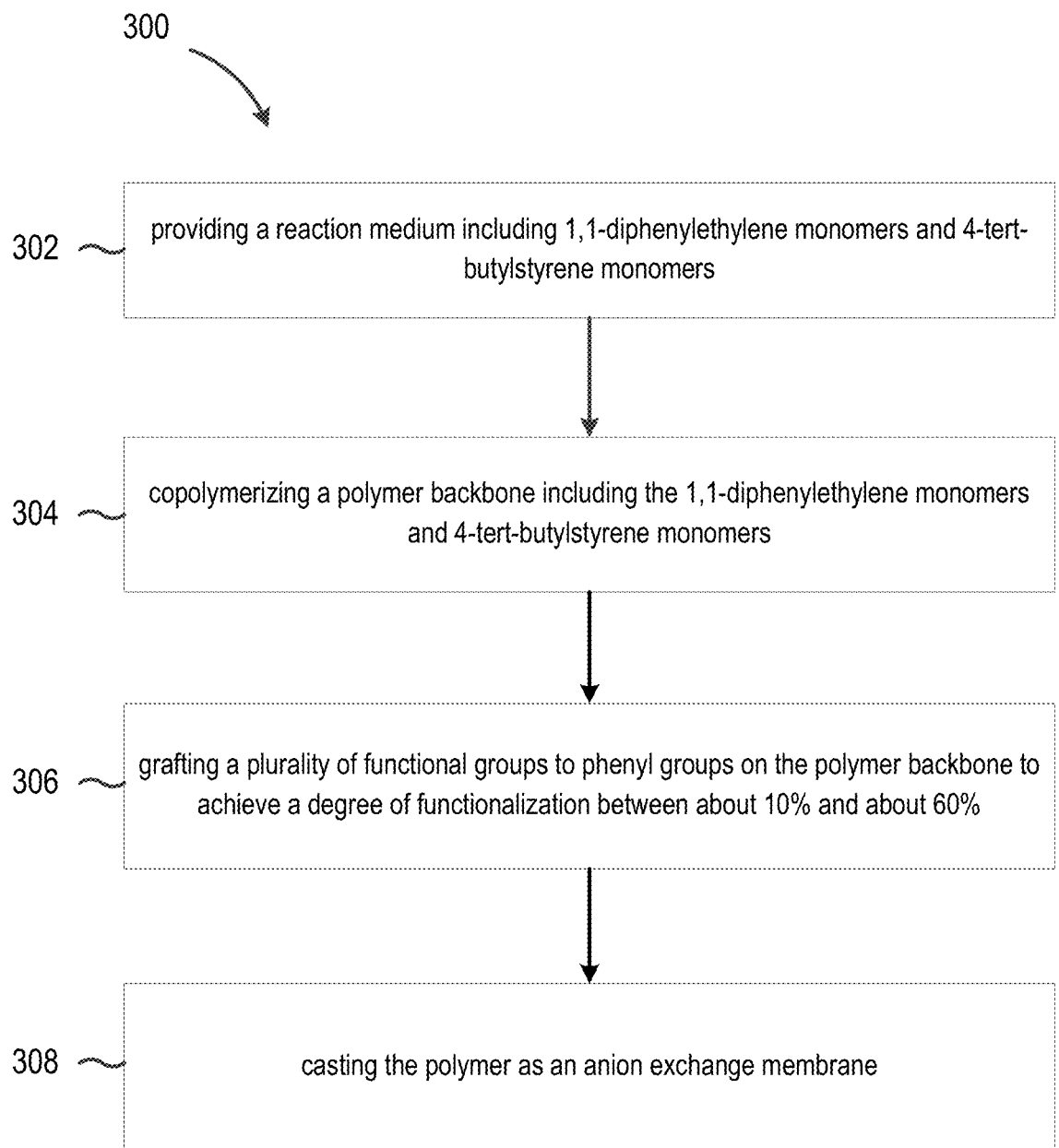
FIG. 3 is a chart of a method of making an anion exchange membrane according to some embodiments of the present disclosure.

Referring now to FIG. 3, some embodiments of the present disclosure are directed to a method 300 of making an anion exchange membrane. At 302, a reaction medium including 1,1-diphenylethylene monomers and 4-tert-butylstyrene monomers is provided. At 304, a polymer backbone including the 1,1-diphenylethylene monomers and 4-tert-butylstyrene monomers is copolymerized. At 306, a plurality of functional groups are grafted to phenyl groups on the polymer backbone to achieve a degree of functionalization between about 10% and about 60%. In some embodiments, the polymer backbone is functionalized with one or more haloalkylated precursor substrates. In some embodiments, the halide of the attached haloalkylated precursor substrate is substituted with another ionic group, e.g., a quaternary ammonium group. In some embodiments, as discussed above, the polymer includes the structure according to Formula II:

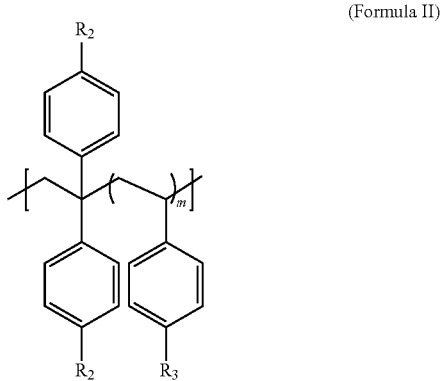

(Formula II)

In some embodiments, $R_2$ is H, an alkylated substrate, or combinations thereof. In some embodiments, $R_3$ a tert-butyl group; and m is 1 or more. In some embodiments, the alkylated substrate includes one or more quaternary ammonium groups, one or more multication hydrocarbyl groups, one or more halide groups, or combinations thereof. In some embodiments, the alkylated substrate includes Formula III:

(Formula III)

In some embodiments, each $R_4$ includes H or $CH_3$. In some embodiments, n=1 to about 7. In some embodiments, X includes a hydroxide, a halide, or combinations thereof. In some embodiments, the one or more haloalkylated precursor substrates include a tertiary alcohol and a halogenated hydrocarbon. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, the halide of the attached haloalkylated precursor substrate is substituted with another ionic group, e.g., a quaternary ammonium group to arrive at Formula III. At 308, the polymer is cast as an anion exchange membrane.

Figure 4A:
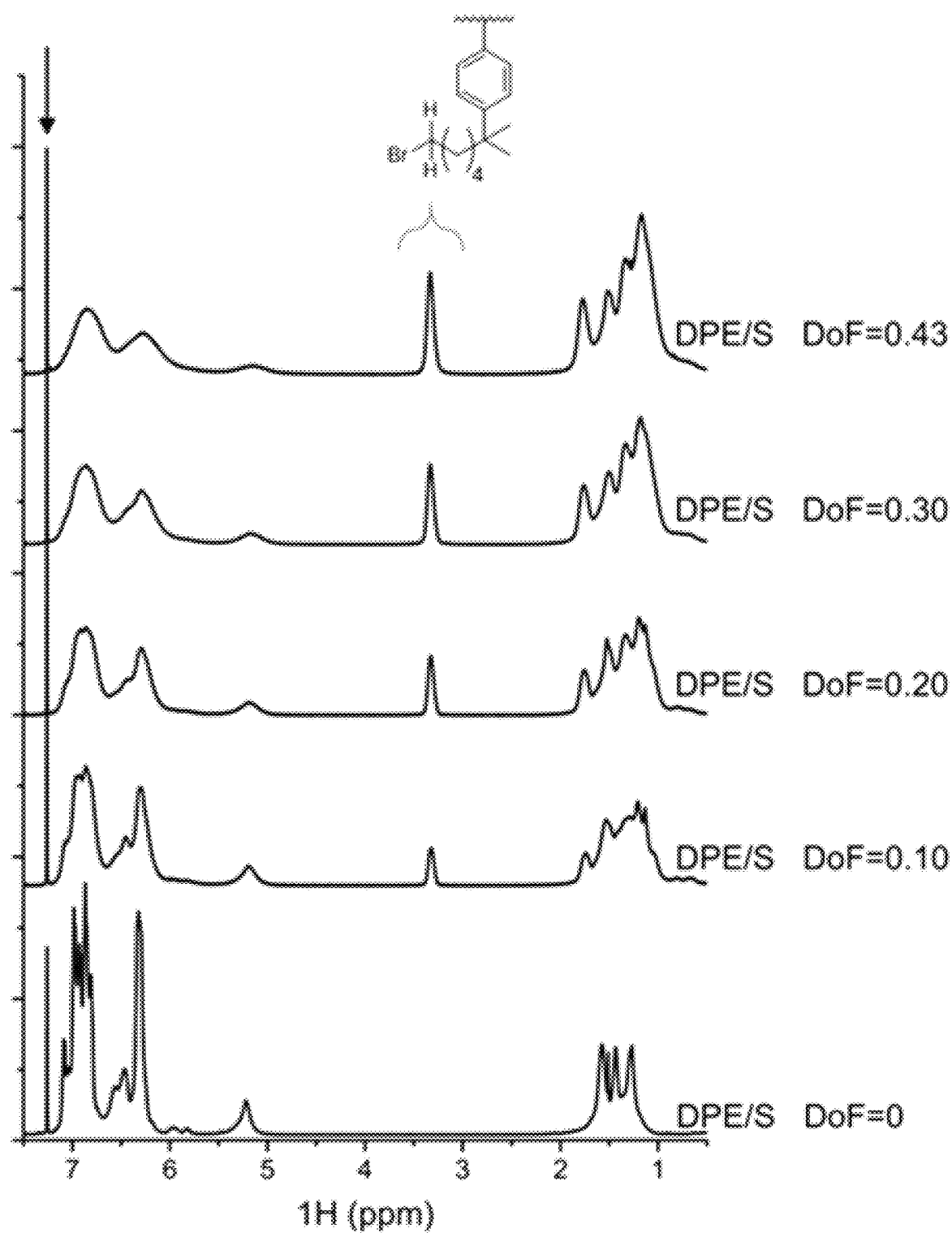
FIG. 4A are $^1$H NMR spectrums of bromo-functionalized poly(diphenylethylene-alt-styrene) (DPE/S) intermediate copolymers according to some embodiments of the present disclosure.
Figure 4B:
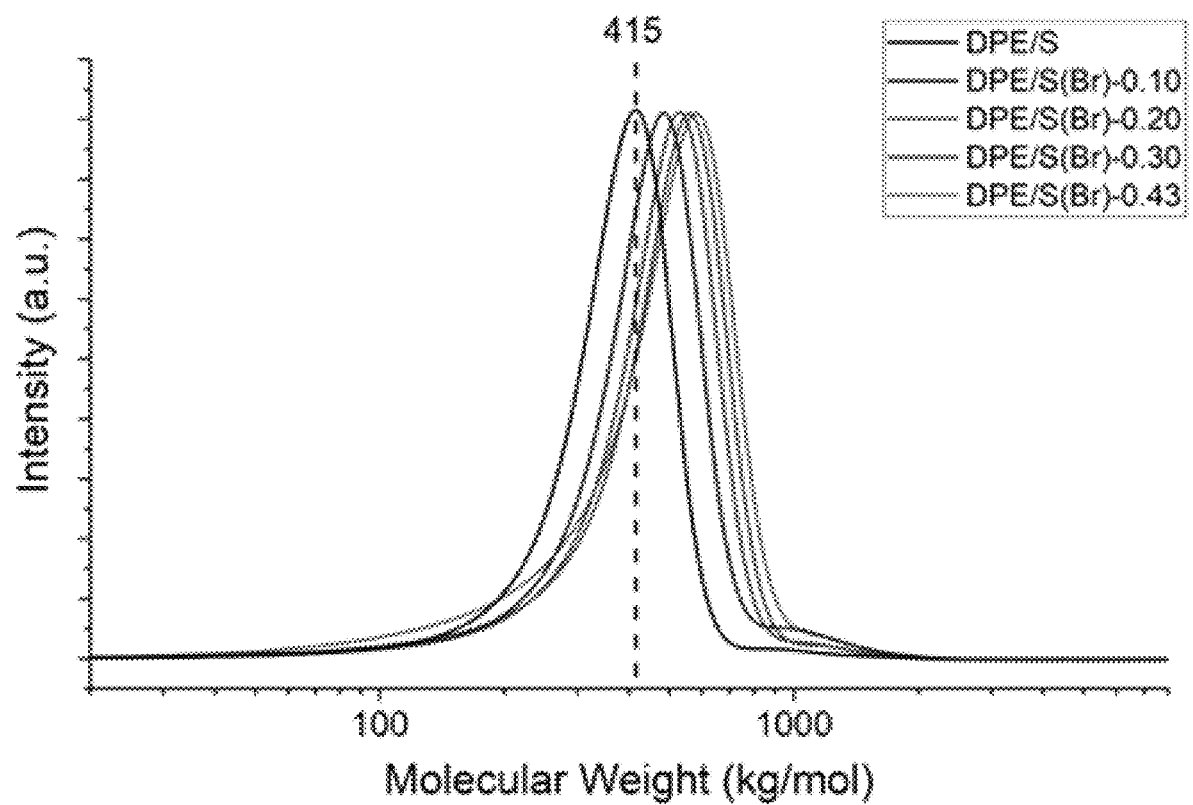
FIG. 4B is a graph showing size exclusion chromatograms of the bromo-functionalized DPE/S intermediate copolymers according to some embodiments of the present disclosure.

By way of example, 1,1-diphenylethylene/styrene (DPE/S) and 1,1-diphenylethylene/4-tert-butylstyrene (DPE/tbS) intermediate copolymers were prepared. The copolymers were functionalized with haloalkyl groups including a bromine ionic group coupled to the backbone of the copolymers via a 5 carbon tether. Referring now to FIG. 4A, the degree of functionalization for the DPE/S intermediate polymers as determined by 1H NMR in $CDCl_3$ (indicated by the arrow at 7.26 ppm) was between 0.1 and 0.43. Properties of the functionalized DPE/S intermediate polymers are summarized in the following Table 1. Size exclusion chromatograms of the functionalized DPE/S intermediate polymers are show in FIG. 4B.

TABLE 1

Properties of bromo-functionalized DPE/S copolymer with n = 5.

| | DoF[a] | Projected IEC (OH−)[b] | $M_n$ (kg/mol)[c] | $M_w$ (kg/mol)[c] | Đ[c] | $T_g$ (° C.)[d] |
|---|---|---|---|---|---|---|
| DPE/S | n/a | n/a | 330 | 390 | 1.2 | 173 |
| DPE/S(Br)-0.10 | 0.10 | 0.9 | 390 | 480 | 1.2 | 158 |
| DPE/S(Br)-0.20 | 0.20 | 1.5 | 400 | 500 | 1.2 | 142 |
| DPE/S(Br)-0.30 | 0.30 | 1.9 | 400 | 510 | 1.3 | 128 |
| DPE/S(Br)-0.43 | 0.43 | 2.4 | 360 | 510 | 1.4 | 114 |

[a]Degree of Functionalization, fraction of phenyls functionalized, determined from $^1$H NMR.
[b]Determined from $^1$H NMR.
[c]Measured by size exclusion chromatography.
[d]Measured by differential scanning calorimetry.

Figure 5A:
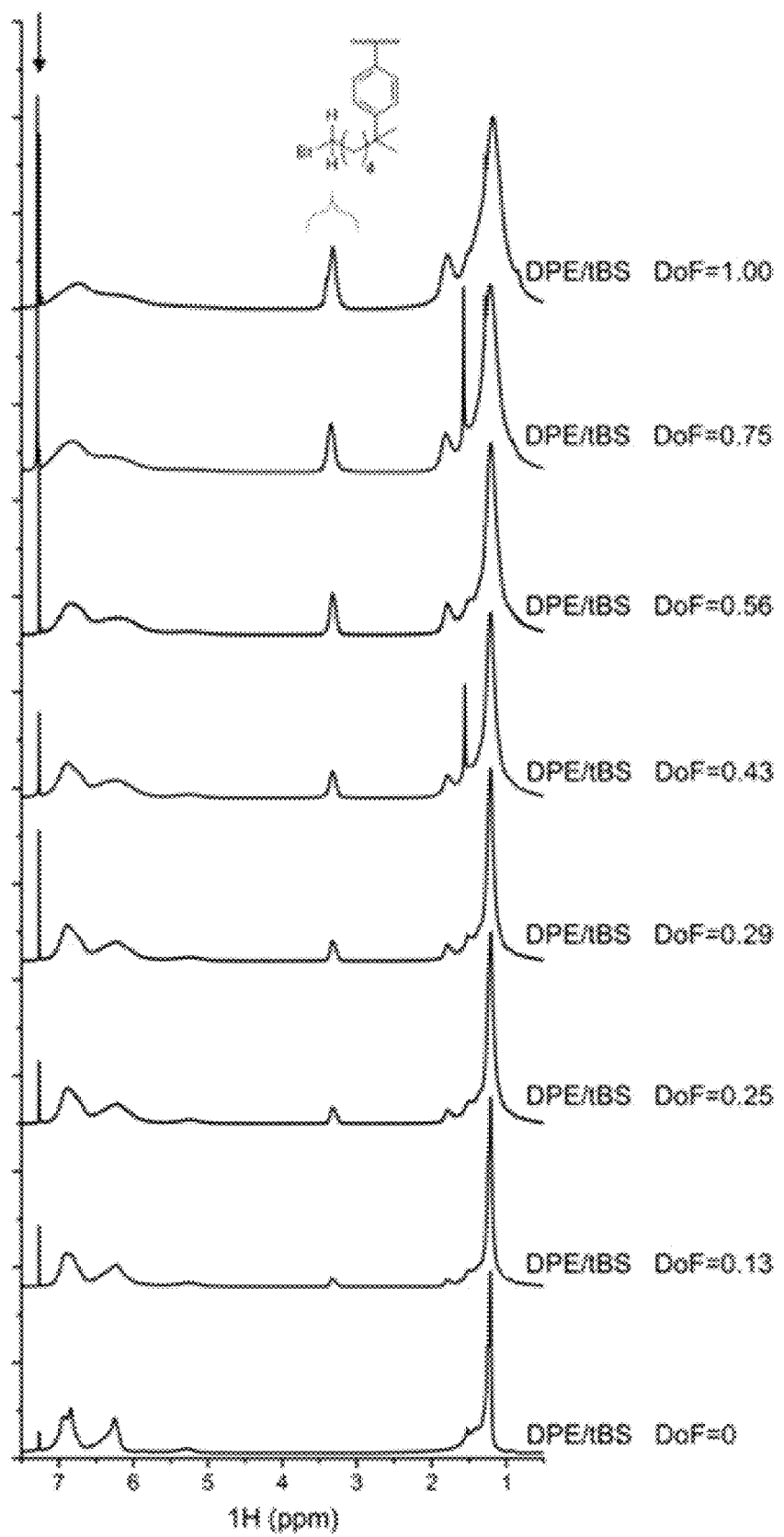
FIG. 5A are $^1$H NMR spectrums of bromo-functionalized poly(diphenylethylene-alt-tertiary-butylstyrene) (DPE-tbS) intermediate copolymers according to some embodiments of the present disclosure.
Figure 5B:
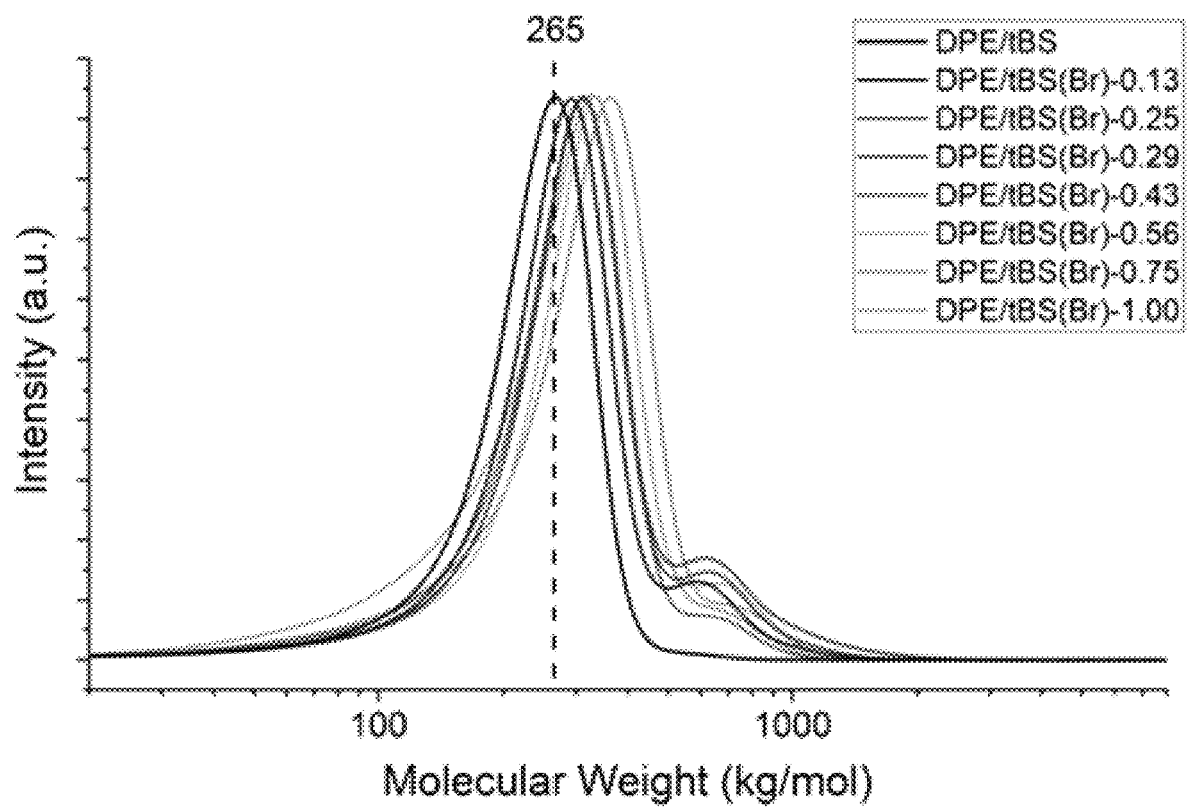
FIG. 5B is a graph showing size exclusion chromatograms of the bromo-functionalized DPE/tbS intermediate copolymers according to some embodiments of the present disclosure.

Referring now to FIG. 5A, the degree of functionalization for the DPE/tBS polymers as determined by 1H NMR in $CDCl_3$ was between 0.1 and 1.00. Properties of the functionalized DPE/tBS intermediate polymers are summarized in the following Table 2. Size exclusion chromatograms of the functionalized DPE/tBS intermediate polymers are show in FIG. 5B.

TABLE 2

Properties of bromo-functionalized DPE/tBS copolymer with n = 5.

| | DoF[a] | Projected IEC (OH−)[b] | $M_n$ (kg/mol)[c] | $M_w$ (kg/mol)[c] | Đ[c] | $T_g$ (° C.)[d] |
|---|---|---|---|---|---|---|
| DPE/tBS | n/a | n/a | 200 | 250 | 1.2 | 195 |
| DPE/tBS(Br)-0.13 | 0.13 | 0.7 | 230 | 310 | 1.3 | 175 |
| DPE/tBS(Br)-0.25 | 0.25 | 1.1 | 250 | 350 | 1.4 | 161 |
| DPE/tBS(Br)-0.29 | 0.29 | 1.3 | 250 | 330 | 1.3 | 159 |
| DPE/tBS(Br)-0.43 | 0.43 | 1.7 | 240 | 310 | 1.3 | 146 |
| DPE/tBS(Br)-0.56 | 0.56 | 2.0 | 260 | 350 | 1.4 | 135 |
| DPE/tBS(Br)-0.75 | 0.75 | 2.4 | 220 | 300 | 1.4 | 121 |
| DPE/tBS(Br)-1.00 | 1.00 | 2.8 | 230 | 340 | 1.5 | 113 |

[a]Degree of Functionalization, fraction of phenyls functionalized, determined from $^1$H NMR.
[b]Determined from $^1$H NMR.
[c]Measured by size exclusion chromatography.
[d]Measured by differential scanning calorimetry.

Figure 6A:
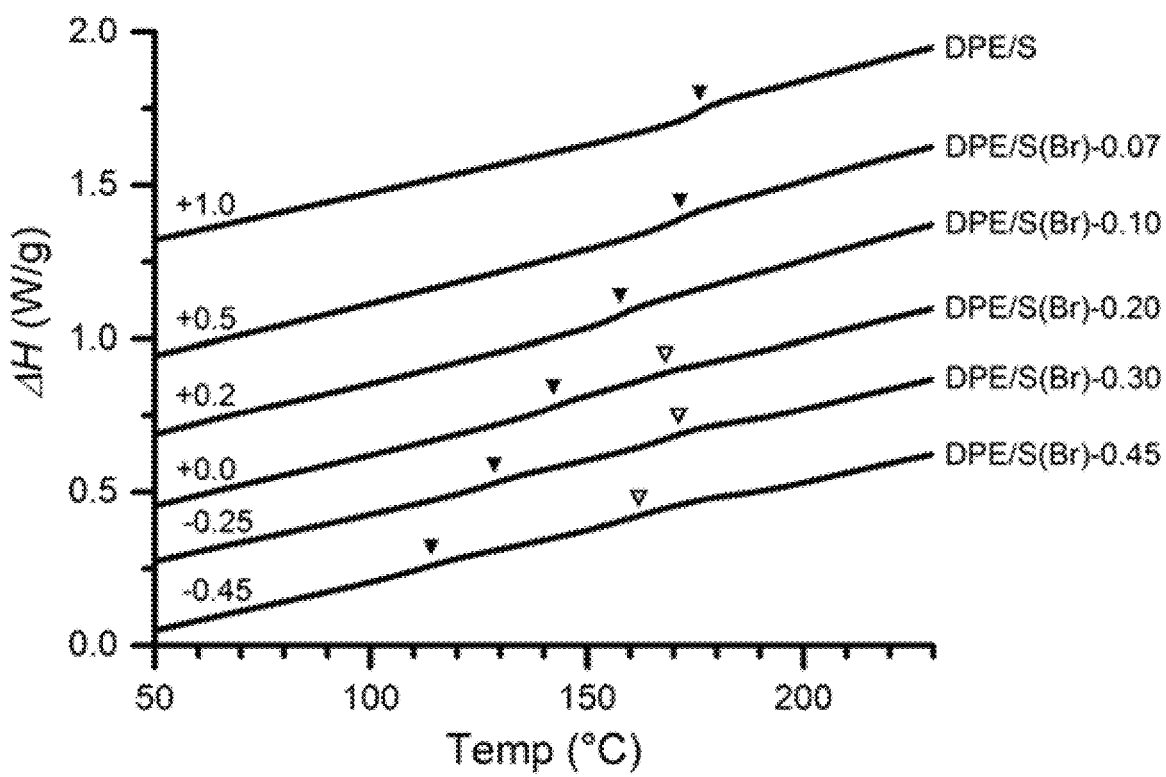
FIG. 6A is a graph portraying differential scanning calorimetry of bromo-functionalized DPE/S intermediate copolymers according to some embodiments of the present disclosure, wherein the filled triangles indicate $T_g$, the unfilled triangles indicate a second $T_g$, and thermograms are vertically shifted by the shift factors on the left.
Figure 6B:
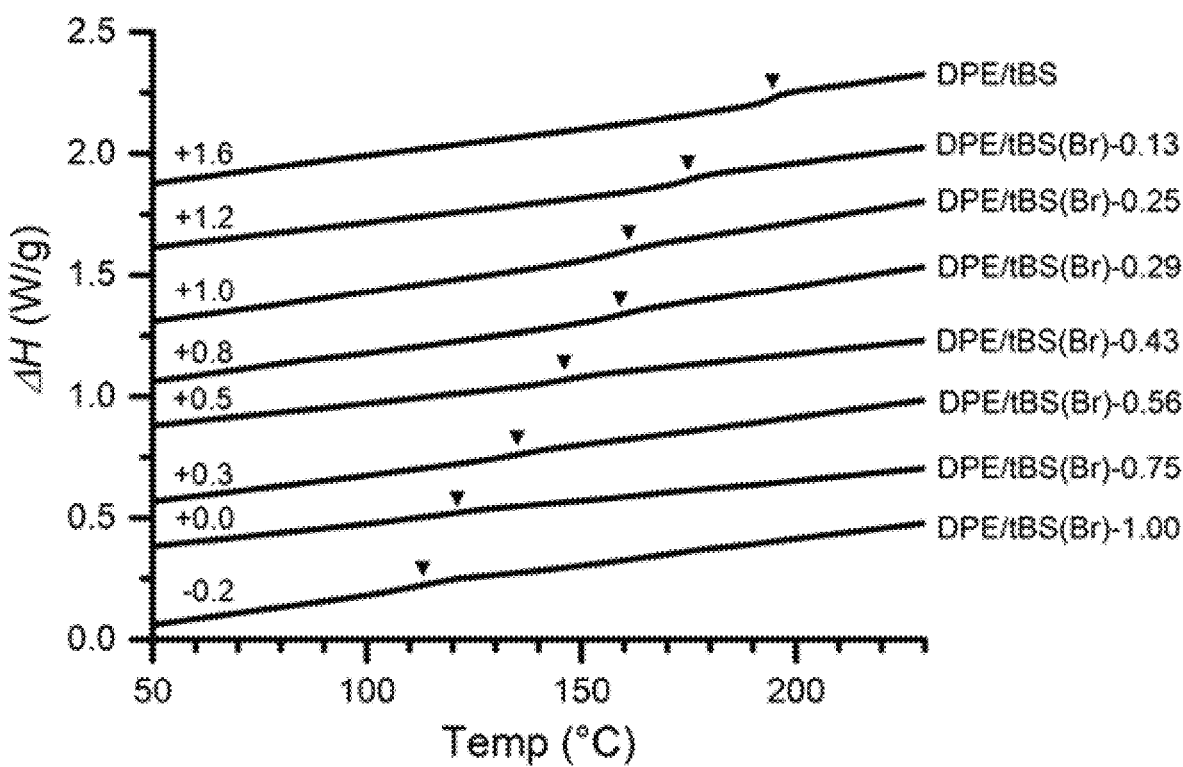
FIG. 6B is a graph portraying differential scanning calorimetry of bromo-functionalized DPE/tbS intermediate copolymers according to some embodiments of the present disclosure, wherein the filled triangles indicate $T_g$ and thermograms are vertically shifted by the shift factors on the left.

Referring now to FIGS. 6A and 6B, results of differential scanning calorimetry analysis of the DPE/S and DPE/tbS intermediates are shown. As can be seen, glass transition temperatures remained above 100° ° C. even at high degrees of functionalization. The polymers thus remain suitable for use at high-temperature operating conditions in anion exchange membranes, e.g., in electrochemical energy conversion systems.

Figure 7:
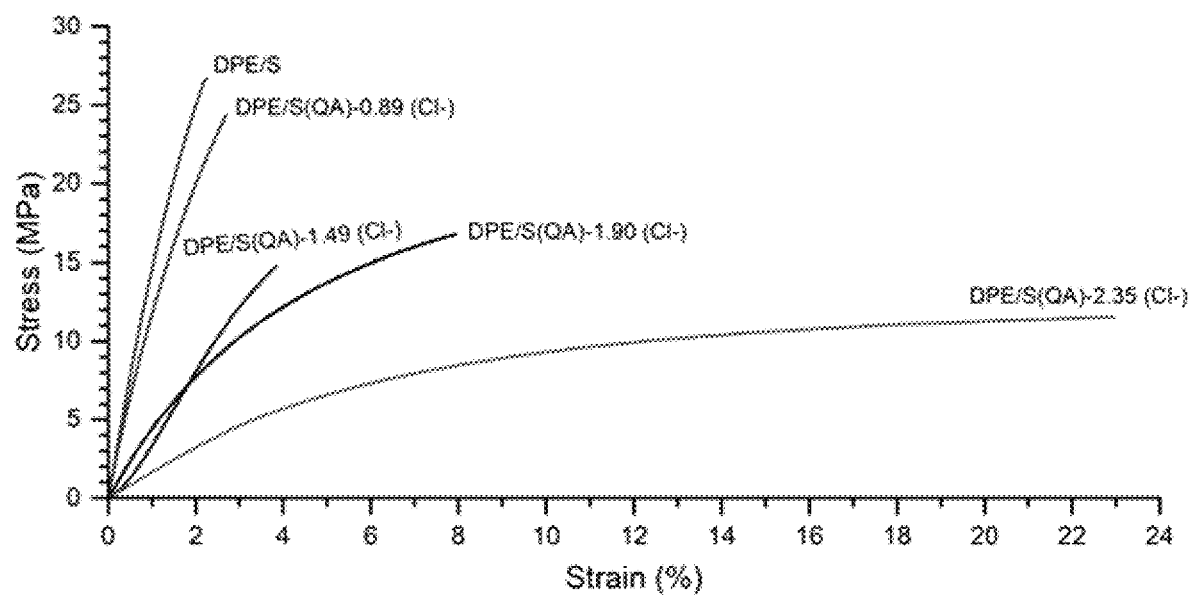
FIG. 7 shows stress versus strain curves of quaternary ammonium-functionalized DPE/S (DPE/S(QA)) with chloride counter ion membranes according to some embodiments of the present disclosure at 50° C. and 50% relative humidity, wherein the ion exchange capacities of membranes are noted in the sample names.

The bromine of the ionic functional groups were then substituted with quaternary ammonium groups to convert the intermediate copolymers (DPE/S(Br) and DPE/tbS(Br)) to DPE/S(QA) and DPE/tbS(QA), respectively. Conductivity analysis of these polymers can be seen in Tables 3 and 4 below. By maintaining stability at elevated temperatures, membranes composed of the polymers of the present disclosure can benefit from the increased conductivities achieved with increasing temperature. Finally, as can be seen in FIG. 7, the material also achieve higher degrees of ductility as ion exchange capacities increase.

TABLE 3

Conductivity of DPE/S(QA) copolymers.

| | Cl⁻/OH⁻ σ (mS/cm) | | | |
|---|---|---|---|---|
| | 30° C. | 60° C. | 80° C. | 95° C. |
| DPE/S(QA)-0.10 | —/6 | —/12 | —/21 | /27 |
| DPE/S(QA)-0.20 | 6/42 | 15/73 | 29/99 | 49/109 |
| DPE/S(QA)-0.30 | 13/46 | 34/88 | 51/95 | 70/76 |
| DPE/S(QA)-0.43 | 27/— | 38/— | 30/— | 21/— |

TABLE 4

Conductivity of DPE/S(QA) copolymers.

| | Cl⁻/OH⁻ σ (mS/cm) | | | |
|---|---|---|---|---|
| | 30° C. | 60° C. | 80° C. | 95° C. |
| DPE/tBS(QA)-0.29 | 4/10 | 8/24 | 14/40 | 19/46 |
| DPE/tBS(QA)-0.43 | 8/— | 20/— | 31/— | 44/— |
| DPE/tBS(QA)-0.56 | 16/65 | 33/97 | 55/121 | 57/91 |
| DPE/tBS(QA)-0.75 | 20/56 | 41/73 | 60/54 | 78/40 |
| DPE/tBS(QA)-1.00 | 28/— | 46/— | 28/— | 21/— |

Figure 8:
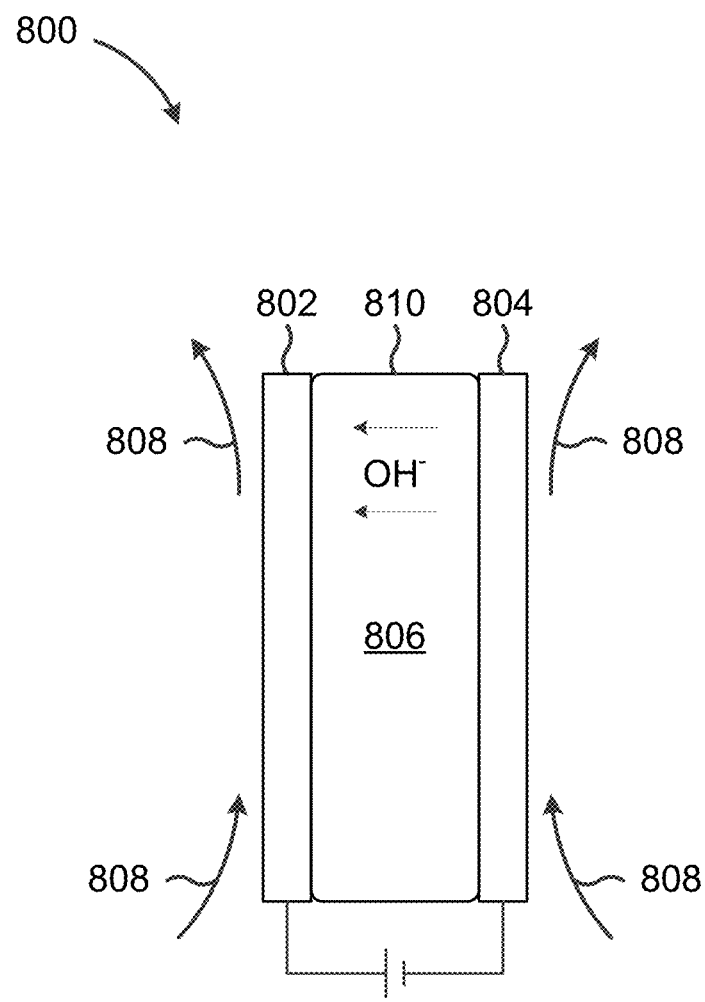
FIG. 8 is a schematic drawing of an electrochemical energy conversion system including an ion exchange membrane according to some embodiments of the present disclosure.

Referring now to FIG. 8, in some embodiments, the ion exchange membrane material is incorporated into an electrochemical energy conversion system 800. In some embodiments, system 800 includes an anode 802, a cathode 804, and an electrolyte 806 disposed between the anode and the cathode. System 800 is suitable for use in numerous applications, such as fuel cells, energy recovery ventilation systems, water electrolysis systems, electrochemical hydrogen compressors, batteries, sensors, actuators, etc. In some embodiments, anode 802 and cathode 804 are composed of any suitable material for use with electrolyte 806 in system 800. In some embodiments, system 800 includes any inlets/outlets 808 to supply reactants to and remove reaction products from anode 802, cathode 804, and electrolyte 806. In some embodiments, system 800 includes a catalyst layer (not pictured).

In some embodiments, electrolyte 806 includes a solid electrolyte. In some embodiments, electrolyte 806 includes ion exchange membrane 810 including the ion exchange membrane material consistent with the embodiments discussed above. In some embodiments, ion exchange membrane 810 is an anion exchange membrane.

Methods and systems of the present disclosure maintain high glass transition temperatures from copolymers synthesized using diphenylalkylene and styrene-derivative monomers. The phenyl groups from the diphenylalkylene and styrene derivatives are then functionalized with ionic functional groups, making the polymers particularly suitable for use as anion exchange membranes. Incorporating 1,1-diphenylethylene in the backbone of these copolymers has the effect of increasing the glass transition temperature, increasing the thermal stability of alkaline anion exchange membrane made from these polymers. The properties of the membranes are tunable according to the needs of the end user by selecting the combination of functional groups used and the degree of functionalization of the phenyl groups, while maintaining operational stability at elevated temperatures. High-temperature conditions enabled by these copolymers enhance conductivity performance, particularly advantageous for use in fuel cells, electrolyzers employing hydrogen, ion separations, etc.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A method of making an anion exchange membrane, comprising:
    providing a reaction medium including 1,1-diphenylethylene monomers and 4-tert-butylstyrene monomers;
    copolymerizing a polymer backbone including the 1,1-diphenylethylene monomers and 4-tert-butylstyrene monomers;
    grafting a plurality of functional groups to phenyl groups on the polymer backbone to achieve a degree of functionalization between about 10% and about 60%; and
    casting the polymer as an anion exchange membrane.

2. The method according to claim 1, wherein grafting a plurality of functional groups to phenyl groups on the polymer backbone includes chloromethylation, radical bromination, Friedel-Crafts acylation and alkylation, and sulfonation followed by amination, or combinations thereof.

3. The method according to claim 1, wherein the functional groups include alkylated substrates including a hydrocarbyl group and at least one ionic group.

4. The method according to claim 3, wherein the polymer includes the structure according to Formula II:

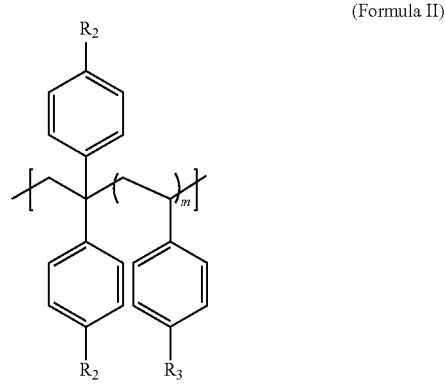

(Formula II)

wherein R₂ is H, an alkylated substrate, or combinations thereof; R₃ is a tert-butyl group; and m is 1 or more.

5. The method according to claim 4, wherein the alkylated substrate includes one or more quaternary ammonium groups, one or more multication hydrocarbyl groups, one or more halide groups, or combinations thereof.

6. The method according to claim 5, wherein the alkylated substrate includes Formula III:

(Formula III)

wherein each R₄ includes H or CH₃; n=1 to about 7; and X includes a hydroxide, a halide, or combinations thereof.

* * * * *